US006804219B2

(12) United States Patent
Koo et al.

(10) Patent No.: US 6,804,219 B2
(45) Date of Patent: Oct. 12, 2004

(54) DATA TRANSMITTING METHOD IN A CDMA SYSTEM

(75) Inventors: Chang-Hoi Koo, Songnam-shi (KR);
Hyun-Seok Lee, Songnam-shi (KR);
Dae-Gyun Kim, Daegu-kwangyeokshi (KR); Hoon Chang, Seoul (KR);
Sung-Won Lee, Songnam-shi (KR)

(73) Assignee: Samsung Electronics, Co., Ltd. (KR)

( * ) Notice: Subject to any disclaimer, the term of this patent is extended or adjusted under 35 U.S.C. 154(b) by 774 days.

(21) Appl. No.: 09/751,172

(22) Filed: Dec. 29, 2000

(65) Prior Publication Data

US 2001/0024431 A1 Sep. 27, 2001

(30) Foreign Application Priority Data

Dec. 29, 1999 (KR) .......................................... 1999-64544

(51) Int. Cl.[7] .............................................. H04B 7/216
(52) U.S. Cl. ........................ 370/335; 370/342; 370/441; 370/479; 370/320; 370/468
(58) Field of Search ................................. 370/318, 320, 370/335, 342, 441, 476, 352–358, 252, 332; 455/450, 452.1, 452.2, 453, 456.2, 458, 466

(56) References Cited

U.S. PATENT DOCUMENTS

| 5,966,384 | A | * | 10/1999 | Felix et al. ............... 370/465 |
| 6,088,578 | A | * | 7/2000 | Manning et al. .......... 455/68 |
| 6,438,119 | B1 | * | 8/2002 | Kim et al. ................ 370/335 |
| 6,456,604 | B1 | * | 9/2002 | Lee et al. ................. 370/328 |
| 6,469,993 | B1 | * | 10/2002 | Seo et al. ................. 370/329 |
| 6,473,419 | B1 | * | 10/2002 | Gray et al. ............... 370/349 |
| 6,490,268 | B1 | * | 12/2002 | Lee et al. ................. 370/342 |
| 6,507,572 | B1 | * | 1/2003 | Kumar et al. ............ 370/335 |
| 6,526,030 | B2 | * | 2/2003 | Rezaiifar et al. ......... 370/335 |

OTHER PUBLICATIONS

Mainak Chatterjee and Sajal K. Das, 'Optimal MAC State Switching for CDMA2000 Networks', Feb. 2000, Center for Research in Wireless Mobility and Networking, 0–7803–7476–Feb. 2, 2002 IEEE.*

* cited by examiner

Primary Examiner—Douglas Olms
Assistant Examiner—Tri H. Phan
(74) Attorney, Agent, or Firm—Dilworth & Barrese, LLP

(57) ABSTRACT

There is provided a data transmitting method in a CDMA system. In the CDMA system, a control hold state and an active state are set for data transmission between a mobile station and a base station. The control hold state is entered to transmit a control signal on a dedicated control channel and the active state is divided into a low rate transmission substate for transmitting a small amount of data on the dedicated control channel or/and a fundamental channel and a high rate transmission substate for transmitting a large amount of data on a supplemental channel and on at least one of the dedicated control channel and the fundamental channel. When a large amount of user data is generated in the mobile station, the mobile station generates a supplemental channel request message including supplemental channel request information needed to transit from the control hold state to the high rate transmission substate without interposition of the low rate transmission substate and state transition information needed to transit from the control hold state to the active state, and transmits the supplemental channel request message to the base station.

10 Claims, 7 Drawing Sheets

DATA TRANSMITTING METHOD IN A CDMA SYSTEM

PRIORITY

This application claims priority to an application entitled "Data Transmitting Method in a CDMA System" filed in the Korean Industrial Property Office on Dec. 29, 1999 and assigned Serial No. 99-64544, the contents of which are hereby incorporated by reference.

BACKGROUND OF THE INVENTION

1. Field of the Invention

The present invention relates generally to a Code Division Multiple Access (CDMA) mobile communication system, and in particular, to a packet data communication method.

2. Description of the Related Art

Conventional CDMA mobile communication systems, which primarily provide voice service, have evolved into IMT-2000 standard systems. In addition to voice service, IMT-2000 systems can provide high quality voice service, moving picture service, and Internet browsing.

Communication links between a mobile station (MS) and a base station (BS) in a CDMA mobile communication system are a forward link directed from the base station to the mobile station and a reverse link directed from the mobile station to the base station.

In the CDMA mobile communication system, packet data communication is characterized in that data is bursty and an idle state without transmission data occurs frequently. It has been proposed for the future mobile communication system that channels should be connected only when data is transmitted in a packet data communication service. Considering limited radio resources, base station capacity, and power consumption in a mobile station, a base station must release channels for used in data communication with another mobile station for a non-data transmission period and rapidly reconnect them when data transmission resumes.

Channels are generally classified into physical channels and logical channels. A logical channel is established on a physical channel and a plurality of logical channels may be set up on one physical channel. If the physical channel is released, the logical channel is automatically released. To establish a logical channel, a physical channel is not always established. When a physical channel required for establishing an intended logical channel was established for a different logical channel, all that has to be done is to assign the intended logical channel to the physical channel.

Physical channels are grouped into dedicated channels and common channels according to their characteristics. The dedicated channels are dedicated to communication between a base station and a specific mobile station, like a fundamental channel (FCH), a dedicated control channel (DCCH), and a supplemental channel (SCH). The FCH transmits a voice signal, a data signal, and a signaling signal. The DCCH transmits a data signal and a control signal, supporting a discontinuous transmission mode where data transmission occurs only if transmission data is generated from a higher layer, which makes the DCCH suitable as a control channel for providing packet service efficiently. The SCH transmits a large amount of data. The FCH can be used compatibly based on TIA/EIA-95-B.

Common channels are so named because they are shared by a plurality of mobile stations. Common channels on the forward link are a paging channel, a broadcast channel, a forward common control channel. An access channel, an enhanced access channel, and a reverse common control channel are common channels on the reverse link. The paging channel and the access channel may be used compatibly based on IS-95-B.

Logical channels established on the dedicated physical channels include a dedicated signaling channel (DSCH) and a dedicated traffic channel (DTCH). The DSCH can be assigned on the FCH and the DCCH to exchange control signals between a base station and a mobile station, whereas the DTCH can be established on the FCH, DCCH, and SCH to exchange user data between them.

As common logical channels assigned on the common physical channels, there are a common control channel (CSCH) for transmitting a control signal and a common traffic channel (CTCH) for transmitting user data. The common logical channels are assigned to the forward common channels on the forward link and to the reverse common channels on the reverse link.

FIG. 1 is a conventional state transition diagram for data transmission.

Referring to FIG. 1, when power is applied, a packet null state 110 is entered and a data service-related request is awaited. If a packet data service request is received, the packet null state 110 is transited to an initialization state 120.

Control channels needed for data transmission are established on the forward and reverse links in the initialization state 120. An FCH or a DCCH as a dedicated physical channel is established and a DSCH as a logical channel is established on the FCH or DCCH, in turn. Once the DSCH is established, a mobile station and a base station can carry on a negotiation procedure to negotiate about standards related with an intended service. The standards are termed a service option. Upon completion of the negotiation about a service option, a data service object establishes a DTCH for transmission of user data and transits to an active state 140. If the initialization fails, the packet null state 110 is transited to.

In the active state 140, data is transmitted on the DTCH. If the data service object transits to the active state 140 after setting the service option and as a result, the DTCH is available, the base station and the mobile station perform initialization procedures of RLP (Radio Link Protocol) and PPP (Point-to-Point Protocol). If data transmission is discontinued for a predetermined time T__Active in the active state 140, the DTCH is released and a control hold state 130 is entered. If it is anticipated from an estimate of the amount of oncoming transmission data that a non-data transmission period will last longer, the active state 140 may be transited directly to a suspended state 150 or a dormant state 160 without interposing the control hold state 130.

In the control hold state 130, information about the service option, the RLP, and the PPP are preserved between the mobile station and the base station and the DSCH is still connected. The data service object establishes the DTCH when data transmission resumes within a predetermined time T__Hold and then returns to the active state 140. On the contrary, if transmission data is not generated with $T_{13}$Hold, the DSCH is released and the suspended state 150 is entered. If it is anticipated from an estimate of the amount of oncoming transmission data that a non-data transmission period will last longer, the control hold state 130 may be transited directly to the dormant state 160 without interposing the suspended state 150.

In the suspended state 150, the FCH or the DCCH is released. As a result, the logical channels, the DSCH and the DTCH are released. CSCHs established on a paging channel and an access channel are used for communication between the mobile station and the base station. The information about the service option, the RLP, and the PPP are still preserved between the base station and the mobile station in this state. If user data to be transmitted is generated within a predetermined time T_Suspended, the DSCH and the DTCH are established simultaneously and the suspended state 150 is transited to the active state 140. If no transmission data is generated within T_Suspended, the dormant state 160 is entered.

In the dormant state 160, only the PPP is connected for data service and the other call-related information is all released. If data transmission is to occur within a predetermined time T_Dormant, the active state 140 is transited to. Otherwise, the PPP information is released and the packet null state 110 is entered.

FIG. 2 is a state transition diagram for packet data transmission within the active state.

The active state 200 refers to a state where a DTCH is assigned. As described above, the DTCH may be assigned on an FCH, DCCH, or SCH. Since the SCH is shared in time division by a plurality of mobile stations, it is assigned only when necessary even in the active state. Therefore, the active state 200 is divided into a low rate transmission substate 220 and a high rate transmission substate 210 according to whether the SCH is established or not.

In the low rate transmission substate 220, the FCH or DCCH is established and forward and reverse DSCHs (F/R-DSCH) and DTCHs (F/R-DTCH) are assigned on the physical channel, the FCH or DCCH. Because the transmission rate of the FCH and DCCH is 9.6 or 14.4 Kbps, user data cannot be transmitted at a rate exceeding 9.6 or 14.4 Kbps in the low rate transmission substate 220.

In the high rate transmission substate 210, the SCH is additionally established and a DTCH is established on the SCH. The SCH may be established on only one of the forward and reverse links, as compared to the FCH and the DCCH. Hence, the logical channel, DTCH should be established on the identical link. For example, if the SCH is established on the forward link alone, an F −DTCH is established on the SCH. Due to its variable transmission rate ranging from 9.6 to 153.6 Kbps or from 14.4 to 115.2 Kbps, the SCH is suitable for transmitting a large amount of data adaptively to the radio environment.

When transmission data is generated in a control hold state 230, the f/r DTCH is assigned on the FCH or DCCH and then the low rate transmission substate 220 is transited to. If it is preferable to transmit the user data on the FCH or DCCH, it is transmitted in the low rate transmission substate 220 and the control hold state 230 is entered. On the contrary, if a higher rate channel is required to transmit a large amount of user data, the SCH is additionally established in the low rate transmission substate 220, the DTCH is assigned on the SCH, and then the high rate transmission substate 210 is entered. When the user data is completely transmitted on the SCH in the high rate transmission substate 210 or a predetermined duration time of the SCH expires, the high rate transmission substate 210 transits to the low rate transmission substate 220. If data transmission is discontinued for a predetermined time in the low rate transmission substate 220, the DTCH is released and the control hold state 230 is entered. In case a large amount of data is generated within the predetermined time in the low rate transmission substate 220 or some user data remains from the previous high rate transmission substate 210, the high rate transmission substate 210 is entered again.

FIG. 3 is a message flow for transition from the control hold state 230 to the active state 200 when transmission data is generated in a mobile station in the control hold state 230.

When user data is generated in the mobile station in the control hold state 230, the mobile station transmits a resource request message to a base station in order to transit to the low rate transmission substate 220. A DCCH is maintained between the mobile station and the base station in the control hold state 230. In this state, the transmission rates of a pilot signal transmitted from the mobile station and power control bits (PCBs) transmitted from the base station can be reduced to decrease consumption of resources needed to maintain the DCCH. For example, the transmission rates of the PCBs and the pilot signal can be decreased from 800 per sec to 400 or 200 per sec to thereby reduce the power consumption of the mobile station and interference. However, since the decrease of the transmission rates is effective when there is no transmission data or a small amount of transmission data, it is not suitable for transmission of user data. Therefore, when the control hold state 230 is transited to the active state 200, it is necessary to continuously transmit the pilot signal and the PCBs at predetermined rates. "CH_IND=R-PICH" attached to the resource request message in FIG. 3 represents a request of continuous transmission of a reverse pilot and a power control signal.

Upon receipt of the resource request message, the base station transmits a resource allocation message as an acknowledgment in step 310. Then, the mobile station and the base station initiate continuous transmission of a pilot signal and PCBs at an action time set in the resource allocation message. At this moment, the mobile station and the base station transit to the low rate transmission substate 220 of the active state 200, considering that a DTCH is logically assigned on the DCCH. The mobile station transmits the user data on the assigned DTCH in step 320. If the amount of the user data is great or should be rapidly transmitted, the mobile station can transmit it on an SCH. If the mobile station determines that the SCH must be established, it transmits a supplemental channel request message to the base station in step 330. This message includes information about the required transmission rate and duration time of the SCH. Upon receipt of the supplemental channel request message, the base station assigns available resources and notifies the mobile station of the assignment via an extended supplemental channel assignment message in step 340. The extended supplemental channel assignment message contains information about channel codes to be used by the base station and the mobile station and the duration time, action time, and transmission rate of the SCH. At the action time of the SCH, it is considered that the mobile station and the base station transit to the high rate transmission substate 210 where they can exchange user data on the assigned SCH in step 350. When the duration time set in the extended supplemental channel assignment message expires, the mobile station and the base station discontinue the use of the SCH without exchanging separate messages and return to the low rate transmission substate 220. If either the mobile station or the base station has further data and requests the SCH, the high rate transmission substate 210 can be entered again. If data transmission is completed in the low rate transmission substate 220 in step 370, the base station transmits an extended release message to the mobile station and transits to the control hold state 230 in step 380. To enable discontinuous transmission of a pilot signal and a power control signal in the control hold state 230, the extended release message has "CH_

IND=R-PICH" indicating release of the pilot signal and the power control signal from the continuous transmission mode.

FIG. 4 is a message flow for transition from the control hold state to the active state when transmission data is generated in the base station.

Referring to FIG. 4, the base station transmits the resource allocation message to the mobile station in step 400. The resource allocation message is constructed to have the same structure as that shown in FIG. 3. The mobile station and the base station initiate continuous transmission of a pilot signal and PCBs at an action time set in the resource allocation message and transit to the low rate transmission substate 220 in step 410. If the amount of the user data is great or should be rapidly transmitted, the base station transmits the extended supplemental channel assignment message to the mobile station in step 420 in order to establish an SCH. The extended supplemental channel assignment message is the same in structure as that shown in FIG. 3. The mobile station and the base station can exchange data on the SCH at an action time of the SCH set in the extended supplemental channel assignment message in step 430. This state is considered the high rate transmission substate 210. When the duration time set in the extended supplemental channel assignment message expires, the mobile station and the base station discontinue the use of the SCH without exchanging separate messages and return to the low rate transmission substate 220 in step 440. If either the mobile station or the base station has further data and requests the SCH, the high rate transmission substate 210 can be entered again. If no user data is generated within a predetermined time in the low rate transmission substate 220, the base station transmits the extended release message to the mobile station and transits to the control hold state 230 with the mobile station at the same time in step 450. The extended release message is the same in structure as that shown in FIG. 3.

Control messages as used for channel assignment in the CDMA system are as follows.

1) Resource Request Message (MS→BS)

TABLE 1

| Field | Length (bits) |
|---|---|
| CH_IND | 3 |
| BLOB | 7 |

CH_IND (channel index) field is 3 bits. According to the values of CH_IND, assignment of the following channels are requested.

TABLE 2

| Data | Channel |
|---|---|
| 001 | FCH |
| 010 | DCCH |
| 100 | reverse pilot channel |
| 101 | FCH, reverse pilot channel |
| 110 | DCCH, reverse pilot channel |

BLOB (BLock Of Bits) field is used to match control states in the radio resource controllers of a base station and a mobile station. The layer 3, in which BLOB is generated or received, just conveys the contents of BLOB.

2) Resource Allocation Message (BS→MS)

TABLE 3

| Field | Length (bits) |
|---|---|
| FPC_PRI_CHAN | 1 |
| RPC_CHANNEL | 1 |
| CH_IND | 3 |
| BLOB | 7 |

FPC_PRI_CHAN (Forward Power Control PRImary CHANnel)field indicates a forward physical channel by which a forward power control is to be performed. If FPC_PRI_CHAN is '0' indicates an FCH. If it is '1', it indicates a DCCH.

RPC_CHANNEL (Reverse Power Control CHANNEL) field indicates a forward physical channel that transmits PCBs for the reverse link. If RPC_CHANNEL is '0', it indicates the FCH. If it is '1', this indicates the DCCH.

CH_IND indicates the type of resources assigned between the mobile station and the base station. CH_IND and BLOB are the same in length and contents as those counterparts in the resource request message.

3) Supplemental Channel Request Message (MS→BS)

This message is used when the mobile station requests an SCH. It includes required bandwidth and time-related information. It additionally has the strengths of pilot signals from a plurality of base stations that are measured by the mobile station for use in channel assignment. This message has been already defined in IS-95-B standard.

4) Supplemental Channel Assignment Message (BS→MS)

The supplemental channel assignment message is used when the base station assigns an SCH to the mobile station. It contains information about the action time and duration of the SCH and a corresponding channel code. SCHs may be assigned separately on the forward and reverse links. This message has been already defined in IS-95-B standard.

As shown in FIG. 2, the control hold state 230 is transited to the high rate transmission substate 210 with the low rate transmission substate 220 interposed. However, since a large amount of data is accumulated in a buffer mostly when data transmission resumes, unnecessary state transition from the control hold state 230 to the low rate transmission substate 220 prior to data transmission requires exchange of a plurality of messages, thereby increasing load and unnecessary time consumption.

SUMMARY OF THE INVENTION

It is, therefore, an object of the present invention to provide a method of minimizing time required for data transmission in a CDMA system.

It is another object of the present invention to provide a method of simplifying a data transmission procedure in a CDMA system.

To achieve the above and other objects, there is provided a data transmitting method in a CDMA system. In the CDMA system, a control hold state and an active state are set for data transmission between a mobile station and a base station. The control hold state is entered to transmit a control signal on a dedicated control channel and the active state is divided into a low rate transmission substate for transmitting a small amount of data on the dedicated control channel or/and a fundamental channel and a high rate transmission substate for transmitting a large amount of data on a supplemental channel and on at least one of the dedicated control channel and the fundamental channel. When a large amount of user data is generated in the mobile station, the mobile station generates a supplemental channel request message including existing supplemental channel requestmessage fields needed to transit from the control hold state to the high rate transmission substate without interposition of the low rate transmission substate and state transition information needed to transit from the control hold state to the active state, and transmits the supplemental channel request message to the base station.

When a large amount of user data is generated in the base station, the base station generates a supplemental channel assignment message including the existing supplemental channel assignment message fields needed to transit from the control hold state to the high rate transmission substate without interposition of the low rate transmission substate and state transition information needed to transit from the control hold state to the active state, and transmits the supplemental channel assignment message to the mobile station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
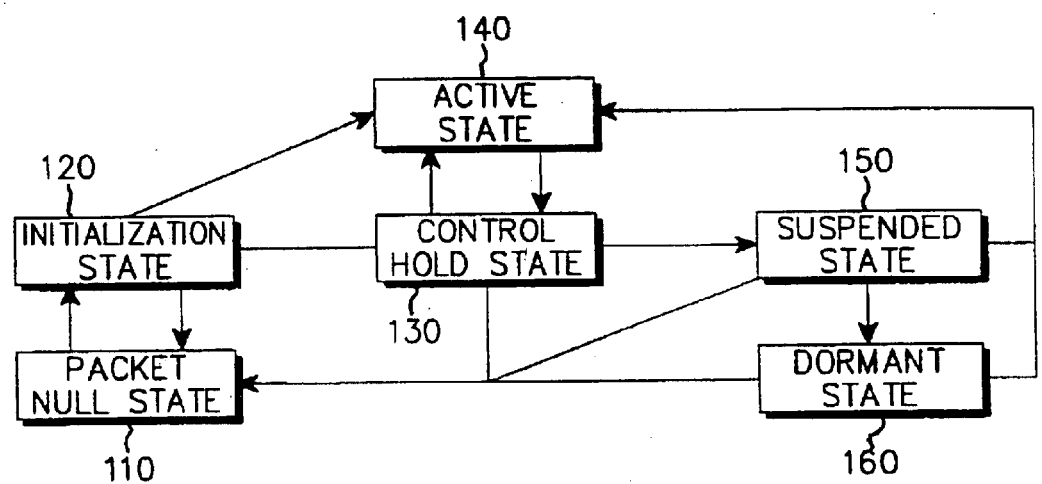
FIG. 1 is a conventional state transition diagram for data transmission.
Figure 2:
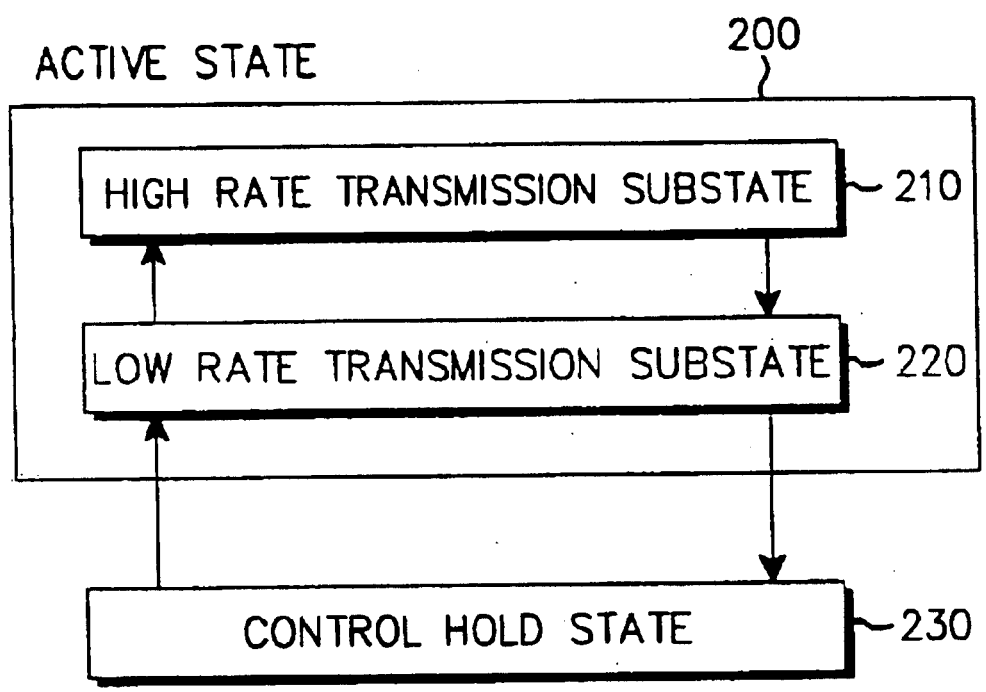
FIG. 2 is a state transition diagram between a control hold state and an active state for packet data transmission.
Figure 3:
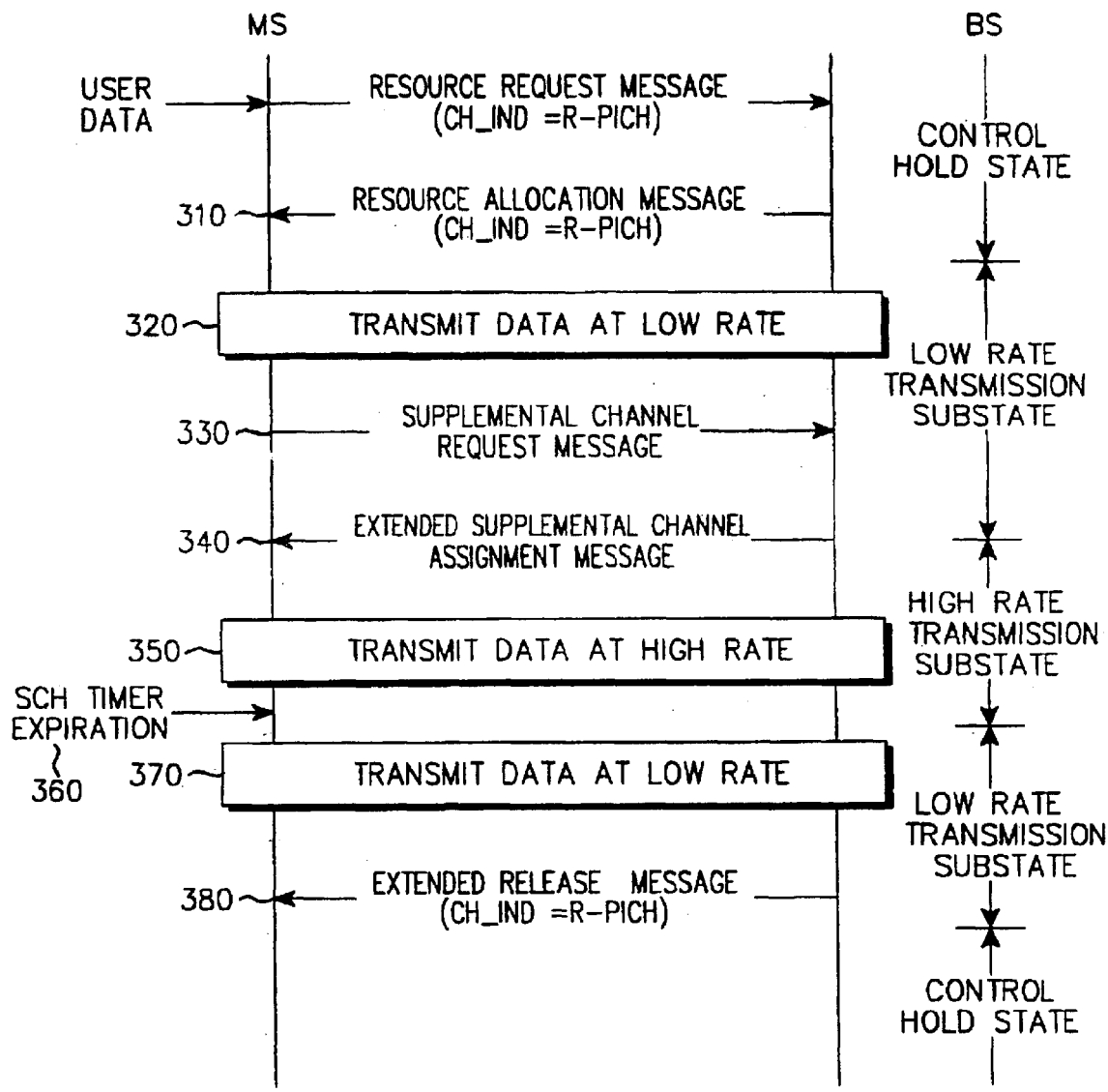
FIG. 3 is a message flow for transition from the control hold state to the active state when transmission data is generated in a mobile station.
Figure 4:
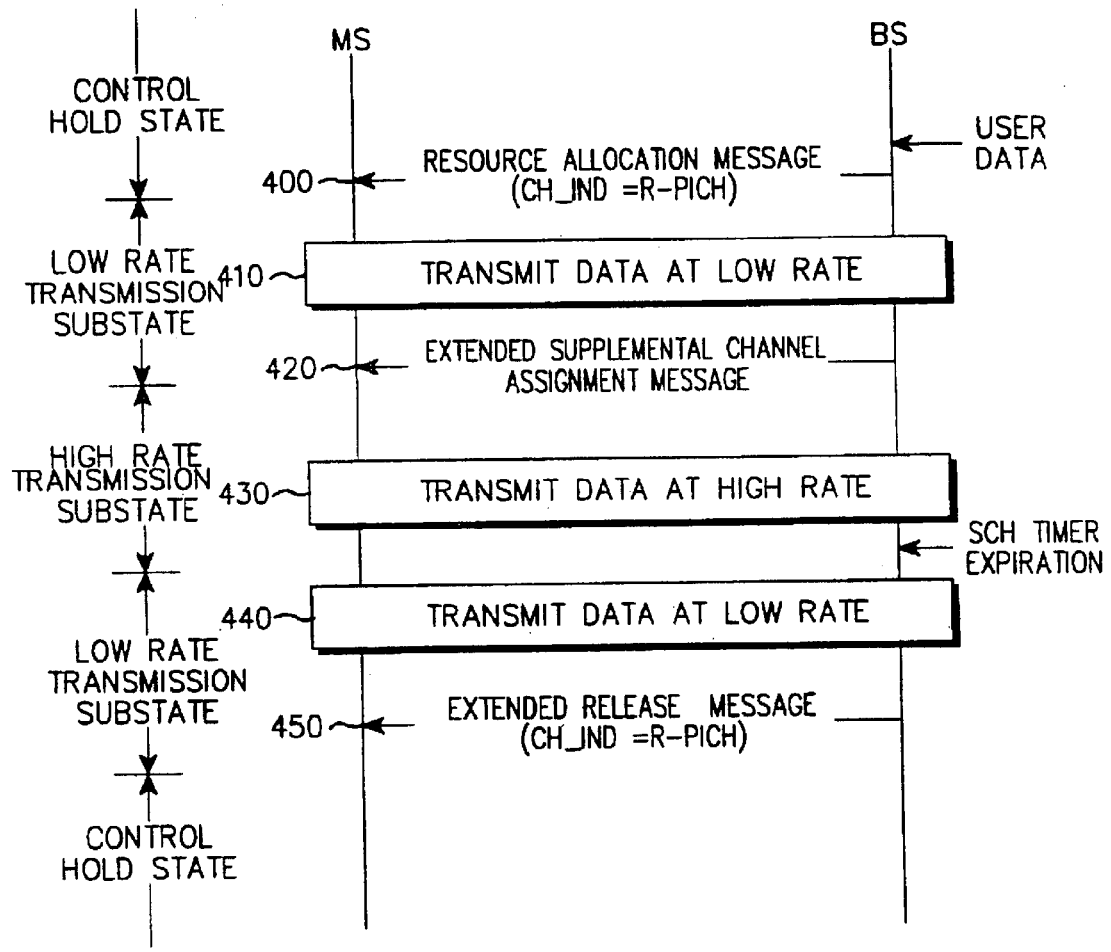
FIG. 4 is a message flow for transition from the control hold state to the active state when transmission data is generated in a base station.
Figure 5:
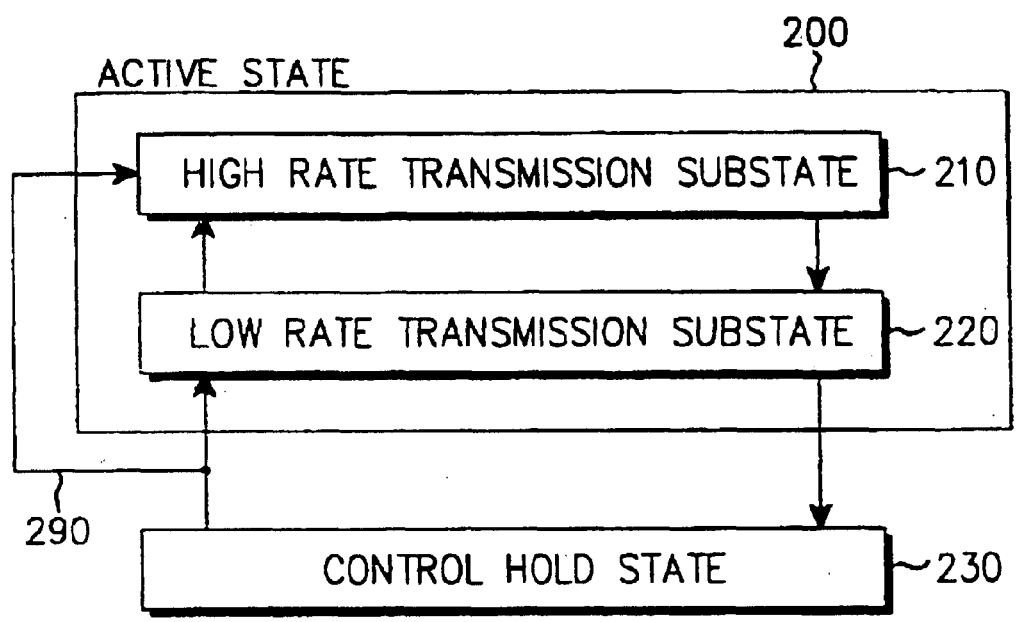
FIG. 5 is a diagram illustrating direct transition from the control hold state to a high rate transmission substate according to an embodiment of the present invention.
Figure 6:
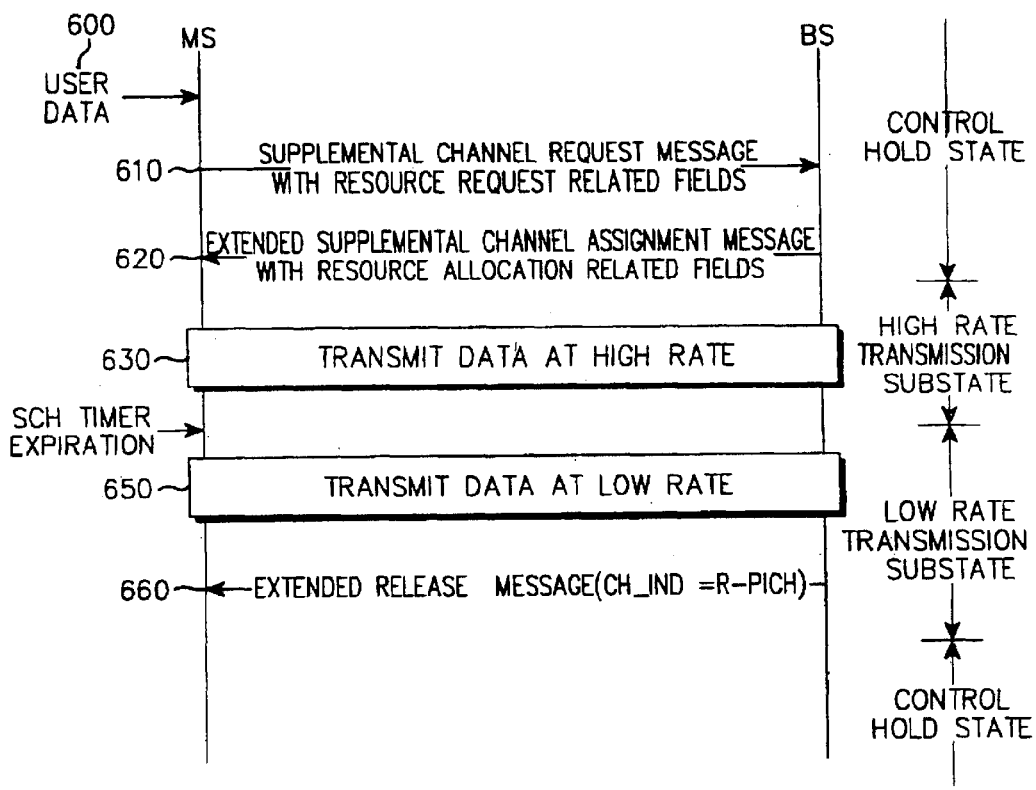
FIG. 6 is a message flow for transition from the control hold state to the active state when transmission data is generated in the mobile station according to the embodiment of the present invention.
Figure 7:
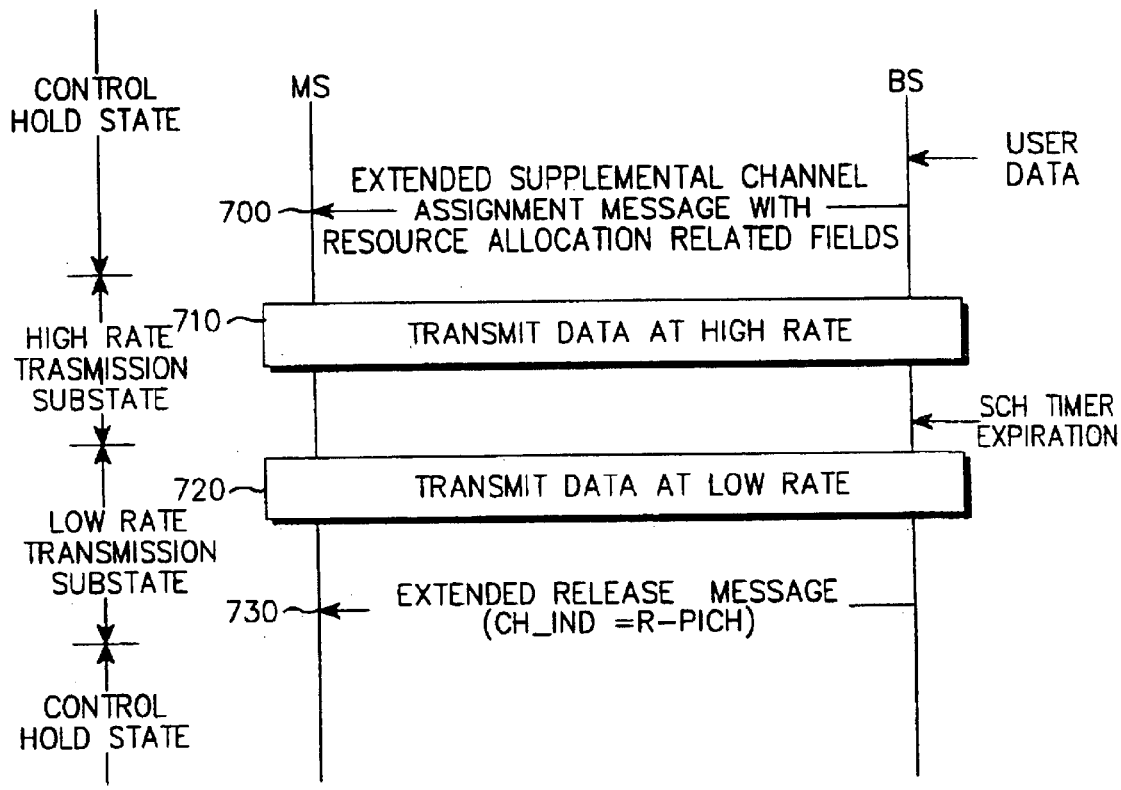
FIG. 7 is a message flow for transition from the control hold state to the active state when transmission data is generated in the base station according to the embodiment of the present invention.

Referring to FIGS. 5, 6, and 7, the embodiment of the present invention will be described below.

In order to allow direct transition from the control hold state 230 to the high rate transmission substate 210, state transition information including the resource request message is added to the existing supplemental channel request message and state transition information including the resource allocation message is added to the existing supplemental channel assignment message. The addition of message fields is conditional in case of occurrence of the conventional state transition from the control hold state 230 to the high rate transmission substate 210 with interposition of the low rate transmission substate 220. Table 4 shows a supplemental channel request message according to the embodiment of the present invention.

TABLE 4

| Field | Length (bits) |
|---|---|
| Existing supplemental channel request message fields | |
| . | |
| . | |
| . | |
| RES_INC | 1 |
| CH_IND | 0 or 3 |
| BLOB | 0 or 7 |

RES_INC (Resource Request Include): this message field indicates whether fields related with the resource request message are included or not. If RES_INC is set to 1, it indicates inclusion of the message fields and if it is set to 0, it indicates exclusion of the message fields.

CH_IND and BLOB fields are the same as the conventional CH_IND and BLOB except that they are conditional on RES_INC field.

The state transition information indicates all the fields tabled in Table 4 except for the existing supplemental channel request message fields, such as RES_INC, CH_IND and BLOB.

Table 5 shows an extended supplemental channel assignment message transmitted from a base station to a mobile station according to the embodiment of the present invention.

TABLE 5

| Field | Length (bits) |
|---|---|
| Existing supplemental channel assignment message fields | |
| . | |
| . | |
| . | |
| RES_INC | 1 |
| FPC_PRI_CHAN | 0 or 1 |
| RPC_CHANNEL | 0 or 1 |
| CH_IND | 0 or 3 |
| BLOB | 0 or 7 |

RES_INC (Resource Allocation Include): this message field indicates whether fields related with the resource allocation message are included or not.

FPC_PRI_CHAN, RPC_CHANNEL, CH_IND, and BLOB fields are the same as the conventional counterparts shown in Table 3.

The state transition information indicates all the fields tabled in Table 5 except for the existing supplemental channel assignment message fields, such as RES_INC, FPC_PRI_CHAN, RPC_CHANNEL, CH_IND and BLOB.

State transition in the case that a large amount of transmission data is generated in a mobile station according to the embodiment of the present invention will be described with reference to FIG. 6.

Referring to FIG. 6, when transmission data is generated in the control hold state 230 in step 600, the mobile station transmits the supplemental channel request message as shown in Table 4 to the base station in step 610. The base station analyzes the received supplemental channel request message, checks an available channel, and transmits an extended supplemental channel assignment message as shown in Table 5 to the mobile station in step 620. In step 630, as an extended supplemental channel assignment message, the mobile station and the base station transit from the control hold state 230 to the high rate transmission substate 210 as indicated by reference numeral 290 in FIG. 5 in step 630. If the transmission data is completely transmitted or the high rate transmission substate 210 is over on some conditions, the high rate transmission substate 210 is transited to the control hold state 230 via the low rate transmission substate 220.

From the view point of messages, upon generation of a large amount of data in step 600, the mobile station transmits the conventional supplemental channel request message with RES_INC field shown in Table 4 to the base station in step 610. The RES_INC field indicates whether there is data to be transmitted after direct transition from the control hold state 230 to the high rate transmission substate 210. If RES_INC is 0, it indicates that such data is absent. Hence, the length of CH_IND and BLOB is zero. On the other hand, RES_INC is 1, CH_IND and BLB are 3 and 7 bits respectively.

CH_IND represents the type of a channel requested by the mobile station and BLOB is used to match control states between the mobile station and the base station.

If RES_INC field is set to 1, the base station determines that the mobile station requested direct transition to the high rate transmission substate 210 and checks whether there is an available channel according to the type of the requested channel. Then, the base station transmits the existing supplemental channel assignment message with RES_INC, FPC_PRI_CHAN, RPC_CHANNEL, CH_IND, and BLOB fields as shown in Table 5. The mobile station determines that the received supplemental channel assignment message is for direct transition from RES_INC set to 1 and directly transits to the high rate transmission substate 210 upon receipt of the following fields FPC_PRI_CHAN, RPC_CHANNEL, CH_IND, and BLOB.

FIG. 7 is a message flow when a large amount of transmission data is generated in the base station. In this case, the channel assignment message is directly transmitted without the need for preliminarily transmitting the supplemental channel request message, as compared to the case that the mobile station is to transmit user data. That is, steps 600 and 610 of FIG. 6 are omitted. Upon generation of user data, the base station transmits the extended supplemental channel assignment message (Table 5) to the mobile station in step 700. As an extened supplemental channel assignment message, the mobile station and the base station transit to the high rate transmission substate 210 in step 710. When data transmission is completed, the high rate transmission substate 210 is transited to the control hold state 230 via the low rate transmission substate 220. While the high rate transmission substate 210 is transited to the control hold state 230 via the low rate transmission substate 220 upon termination of the high rate transmission substate 210, it can be directly transited to the control hold state 230.

The above-described message fields are added to the supplemental channel request message and the extended supplemental channel assignment message, so that the control hold state may be transited directly to the high rate transmission substate without the need of interposing the low rate transmission substate according to the values of the message fields in the present invention. Consequently, time required to transmit a large amount of data can be minimized.

Herein, it should be noted that the message fields are properly defined in order to allow the preferred embodiment of the present invention to be enabled under IS-2000 standard.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data transmitting method in a mobile station of a CDMA system where a control hold state and an active state are set for data transmission between the mobile station and a base station, the control hold state being entered for transmitting a control signal on a dedicated control channel and the active state being divided into a low rate transmission substate for transmitting a small amount of data on the dedicated control channel or/and a fundamental channel and a high rate transmission substate for transmitting a large amount of data on a supplemental channel and on at least one of the dedicated control channel and the fundamental channel, the method comprising the steps of:

generating a supplemental channel request message including existing supplemental channel request message fields and state transition information, which is needed to transition from the control hold state to the high rate transition substate without interposition of the low rate transition substate; and transmitting the supplemental channel request message to the base station.

2. The data transmitting method of claim 1, wherein the supplemental channel request message includes the existing supplemental channel request message fields, a resource request include field and a channel index field.

3. The data transmitting method of claim 1, further comprising the step of transiting to the high rate transmission substate upon receipt of an extended supplemental channel assignment message from the base station after the step of transmitting the supplemental channel request message.

4. The data transmitting method of claim 3, wherein the supplemental channel request message includes the existing supplemental channel request message fields, a resource request include field and a channel index field.

5. The data transmitting method of claim 4, wherein the extended supplemental channel assignment message includes the existing supplemental channel assignment message fields, a resource allocation include field, forward power control primary channel message field and reverse power control channel message field and a channel index field.

6. The data transmitting method of claim 3, wherein the extended supplemental channel assignment message includes basic supplemental channel assignment information, a resource allocation field inclusion indicating field, forward power control primary message field and reverse power control channel message field, and a channel index field.

7. A data transmitting method in a base station of a CDMA system where a control hold state and an active state are set for data transmission between a mobile station and the base station, the control hold state being entered for transmitting a control signal on a dedicated control channel and the active state being divided into a low rate transmission substate for transmitting a small amount of data on the dedicated control channel or/and a fundamental channel and a high rate transmission substate for transmitting a large amount of data on a supplemental channel and on at least one of the dedicated control channel and the fundamental channel, the method comprising the steps of:

generating an extended supplemental channel assignment message including existing supplemental channel assignment message fields and state transition information, which is needed to transition from the control hold state to the high rate transition substate without interposition of the low rate transition substate; and transmitting the supplemental channel assignment message to the mobile station.

8. The data transmitting method of claim 7, further comprising the step of transiting to the high rate transmission substate and transmitting data on an assigned channel after the step of transmitting the extended supplemental channel assignment message.

9. The data transmitting method of claim 7, wherein the extended supplemental channel assignment message includes the existing supplemental channel assignment message fields, a resource allocation include field, a forward power control primary channel message field, and a reverse power control channel message field.

10. The data transmitting method of claim 8, wherein the extended supplemental channel assignment message includes the existing supplemental channel assignment message fields, a resource allocation field inclusion indicating field, a forward power control primary channel message field, and a reverse power control channel message field.

* * * * *